United States Patent
Jau et al.

(10) Patent No.: US 9,367,082 B2
(45) Date of Patent: Jun. 14, 2016

(54) STORAGE ARRAY MODULE AND HARD DISK ACCOMMODATING UNIT THEREOF

(71) Applicant: Quanta Computer Inc., Taoyuan Shieh (TW)

(72) Inventors: Maw-Zan Jau, Taipei (TW);
Chao-Jung Chen, New Taipei (TW);
Yaw-Tzorng Tsorng, Taipei (TW)

(73) Assignee: Quanta Computer Inc., Tao Yuan Shien (TW)

( * ) Notice: Subject to any disclaimer, the term of this patent is extended or adjusted under 35 U.S.C. 154(b) by 104 days.

(21) Appl. No.: 14/070,379

(22) Filed: Nov. 1, 2013

(65) Prior Publication Data
US 2014/0340837 A1  Nov. 20, 2014

(30) Foreign Application Priority Data
May 16, 2013  (TW) .............................. 102117388 A (51) Int. Cl.
*G06F 1/20* (2006.01)
*G06F 1/16* (2006.01)
*G06F 1/18* (2006.01)
*G11B 33/12* (2006.01)

(52) U.S. Cl.
CPC ........... *G06F 1/16* (2013.01); *G06F 1/187* (2013.01); *G11B 33/124* (2013.01); *G11B 33/128* (2013.01)

(58) Field of Classification Search
CPC .................................. G06F 1/187; G06F 1/20
USPC ...................................................... 361/679.33
See application file for complete search history.

(56) References Cited

U.S. PATENT DOCUMENTS

| | | | |
|---|---|---|---|
| 2005/0194287 A1* | 9/2005 | Lien et al. ....................... 206/565 |
| 2006/0133030 A1* | 6/2006 | Takahashi et al. ............. 361/685 |
| 2012/0097623 A1* | 4/2012 | Zhang et al. ..................... 211/26 |
| 2012/0155012 A1* | 6/2012 | Guo et al. ................. 361/679.39 |
| 2012/0213577 A1* | 8/2012 | Fan ................... 403/327 |
| 2012/0257347 A1* | 10/2012 | Liang ....................... 361/679.39 |
| 2012/0273435 A1* | 11/2012 | Liang et al. ..................... 211/26 |
| 2013/0342989 A1* | 12/2013 | Singleton ................. 361/679.39 |
| 2014/0022723 A1* | 1/2014 | Yang et al. ............... 361/679.37 |
| 2014/0146463 A1* | 5/2014 | Hsieh et al. .............. 361/679.33 |

FOREIGN PATENT DOCUMENTS

| | | |
|---|---|---|
| JP | 2002-297263 | 10/2002 |
| JP | 2006-172675 | 6/2006 |
| JP | 2006-235964 | 9/2006 |
| JP | U3140594 | 4/2008 |

OTHER PUBLICATIONS

European Search Report issued on Apr. 1, 2015 in European Application No. 13194072.8.

* cited by examiner

*Primary Examiner* — Forrest M Phillips
(74) *Attorney, Agent, or Firm* — Polsinelli PC (57) ABSTRACT

A storage array module and a hard disk accommodating unit thereof are provided. The hard disk accommodating unit includes a fixing recess, a first tray and a second tray. The first tray is reciprocally and slidably disposed in the fixing recess. The second tray is reciprocally and slidably disposed on the first tray. When the second tray slides a distance in a sliding direction, the second tray pushes the first tray into the fixing recess, after the second tray reversely slides the distance in the sliding direction, the second tray pushes the first tray for protruding out of the fixing recess.

11 Claims, 11 Drawing Sheets

STORAGE ARRAY MODULE AND HARD DISK ACCOMMODATING UNIT THEREOF

CROSS-REFERENCE TO RELATED APPLICATIONS

This application claims priority to Taiwan Application Serial Number 102117388, filed May 16, 2013, which are herein incorporated by reference.

FIELD OF THE INVENTION

The disclosure relates to a storage array module and a hard disk accommodating unit thereof.

BACKGROUND

A server is often installed with plural replaceable data access devices such as hard disk drivers for expanding or enhancing the performance of a computer.

There are many kinds of means for installing the data access device in a machine case of the server; for example, screws are configured for directly locking the data access device on a carrying rack, or sliding rails can be installed at two sides of the data access device with screws and then the carrying rack can be guided into the sliding rails for fastening the data access device with screws or other securing members.

However, in the above-mentioned means, installing and detaching the data access device involve fastening and releasing a considerable amount of screws, respectively, so that the procedure is complicated and inconvenient.

SUMMARY

In the present disclosure, one technical solution of the present disclosure is to provide a storage array module and a hard disk accommodating unit thereof for solving the disadvantages existed in prior art.

According to one embodiment of the present disclosure, the hard disk accommodating unit includes a fixing recess, a first tray, two position-limiting parts, a second tray and two push portions. The first tray is reciprocally and slidably disposed in the fixing recess. The position-limiting parts are disposed on the first tray and arranged with an interval, an imaginary line between the two position-limiting parts is parallel to a sliding direction of the first tray. The second tray is reciprocally and slidably disposed on the first tray, and carries a hard disk driver. The push portions are disposed on the second tray and arranged with an interval, and the imaginary line passes both of the push portions. When the second tray slides a distance along the sliding direction, one of the push portions starts to push one of the position-limiting parts, so the first tray is pushed into the fixing recess. When the second tray protrudes from the fixing recess and slides the distance, the other push portion starts to push the other position-limiting part, such that the first tray is pulled out of the fixing recess.

According to one or more embodiments of the present disclosure, the second tray further comprises a linear opening, and two opposite inner edges of the linear opening are respectively acted as the two push portions, each of the two position-limiting parts is a convex column connected to a first carrying surface of the first tray and passing through the linear opening.

According to one or more embodiments of the present disclosure, the second tray further comprises a linear opening, two opposite inner edges of the linear opening are respectively acted as the two push portions. The first tray further comprises a linear flange connected to the first carrying surface of the first tray and passing through the linear opening. Two opposite ends of the linear flange are respectively acted as the two position-limiting parts.

According to one or more embodiments of the present disclosure, the first tray further comprises a first carrying surface, a lateral wall and a linear notch. The first carrying surface supports the second tray. The lateral wall adjacently connected to the first carrying surface. The linear notch is formed on the lateral wall. Two opposite inner edges of the linear notch are respectively acted as the two position-limiting parts.

According to one or more embodiments of the present disclosure, the second tray further comprises a second carrying surface and an extending fin. The second carrying surface supports the hard disk driver. The extending fin is extended from the second carrying surface to the lateral wall of the first tray, and slidably engaged on the linear notch. Two opposite outer edges of the extending fin are respectively acted as the two push portions.

According to one or more embodiments of the present disclosure, the second tray further comprises a plurality of linear protrusions. The linear protrusions are parallel to each other, and respectively physically contact with the hard disk driver.

According to one or more embodiments of the present disclosure, the second tray further comprises a tray body, a handle, a latch piece, an operation portion and a spring member. The handle is disposed at a distal end of the tray body and located outside the fixing recess, and formed with an inner space therein. The latch piece is disposed in the inner space, and partially protruded out from one surface of the handle. The operation portion is disposed in the inner space, connected to the latch piece, and partially protruded out from another surface of the handle. The spring member is disposed in the inner space, connected to the latch piece and the handle.

According to one or more embodiments of the present disclosure, an inner wall of the fixing recess is further formed with a latch slot, when the first tray slides into the fixing recess, the latch piece is latched in the latch slot.

According to one or more embodiments of the present disclosure, the second tray further comprises at least one block, the block is disposed at the other distal end of the tray body opposite to the handle. When the second tray protrudes out of the fixing recess, the block enables the hard disk driver to be released from a connector in a chassis.

According to one or more embodiments of the present disclosure, the first tray further comprises a first stop part, the fixing recess comprises a second stop part therein. By the second stop part stopping the first stop part, the first tray is unable to be completely released from the fixing recess.

As what has been disclosed above, with the hard disk accommodating unit provided by the present disclosure, when a user wants to remove or replace the hard disk driver disposed therein, no tool is needed for releasing screws, thereby achieving the objective of directly removing or replacing the hard disk driver.

BRIEF DESCRIPTION OF THE DRAWINGS

The present disclosure will be apparent to those skilled in the art by reading the following detailed description of a preferred embodiment thereof, with reference to the attached drawings, in which.

DETAILED DESCRIPTION

The spirit of the disclosure will be described clearly through the drawings and the detailed description as follows. Any of those of ordinary skills in the art can make modifications and variations from the technology taught in the disclosure after understanding the embodiments of the disclosure, without departing from the sprite and scope of the disclosure.

Figure 1:
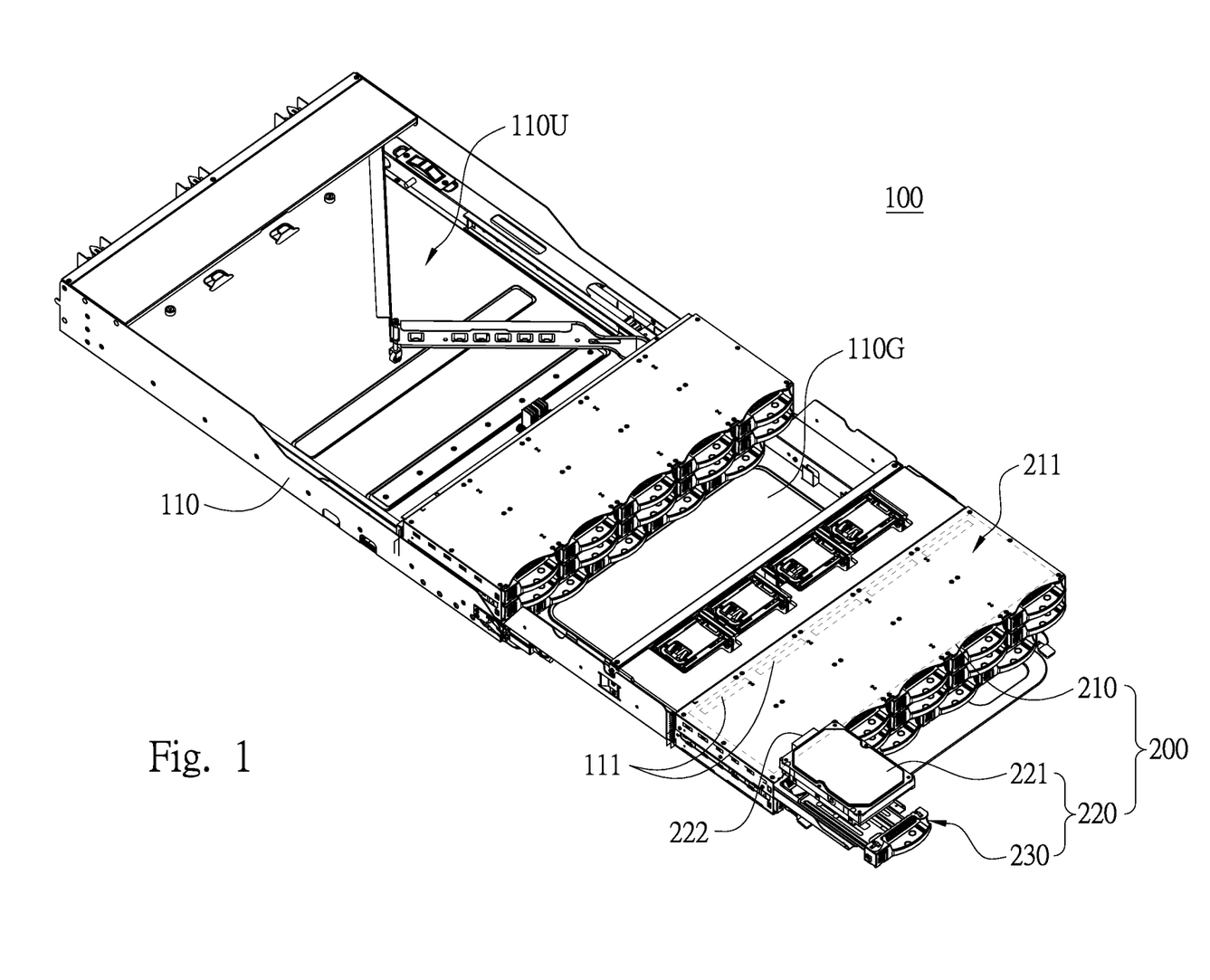
FIG. 1 is a schematic view showing the storage array module being installed in a server according to one embodiment of the present disclosure.

Reference is now made to FIG. 1 in which FIG. 1 is a schematic view showing the storage array module 200 being installed in a server 100 according to one embodiment of the present disclosure. As shown in FIG. 1, the storage array module 200 includes a chassis 210 and a plurality of hard disk units 220. The chassis 210 is formed with an accommodation space 211 and a plurality of first connection ports 111 (e.g., connection terminals of a hard disk driver 221). The first connection port 111 is a tool-free connector arranged in the accommodation space 211. The hard disk units 220 are arranged in the accommodation space 211 with a cluster style, for example, the hard disk units 220 are stacked in the accommodation space 211 with a generalized array way, i.e., the line direction and the row direction of array can be perpendicular or not perpendicular to each other. Each of the hard disk units 220 includes a hard disk accommodating unit 230 and a hard disk driver 221. Each of the hard disk accommodating units 230 only allows single hard disk driver 221 to be accommodated. Each of the hard disk drivers 221 includes a second connection port 222 (e.g., connection terminals of the hard disk driver 221). The second connection port 222 is a tool-free connector which can be detachably coupled to one of the first connection ports 111. Because the hard disk driver 221 is a commonly seen hard disk product, a hard disk case is not provided, thereby defining the hard disk driver 221 as a naked disk driver.

Figure 2A:
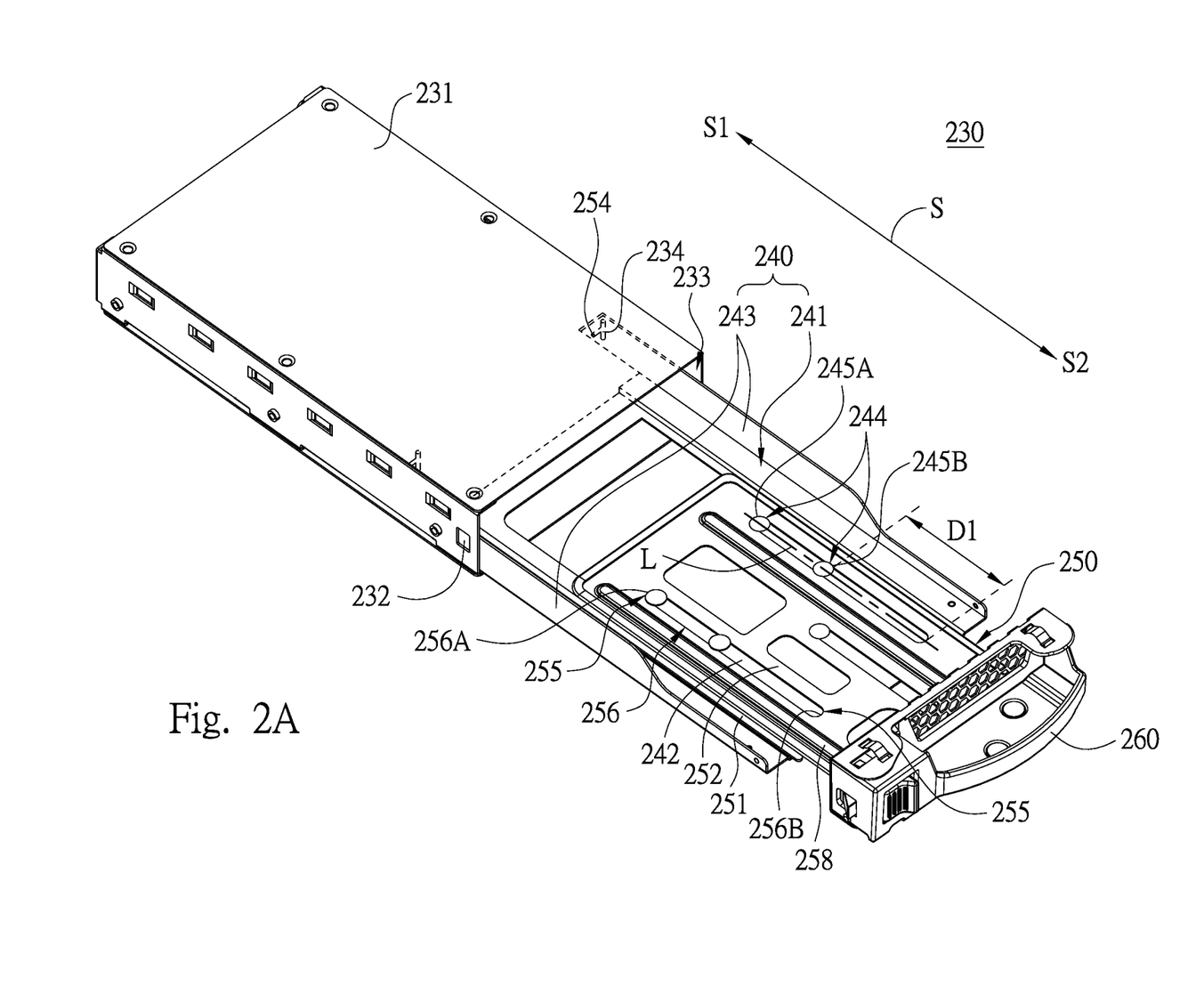
FIG. 2A is a schematic view illustrating the hard disk accommodating unit being in a first pulling out status according to one embodiment of the present disclosure.

FIG. 2A is a schematic view illustrating the hard disk accommodating unit 230 being in a first pulling out status according to one embodiment of the present disclosure. As shown in FIG. 1 and FIG. 2A, each of the hard disk accommodating units 230 includes a casing 231, a first tray 240 and a second tray 250. The casing 231 is formed with a fixing recess 233. The casing 231 is fastened (e.g., being locked) in the accommodation space 211 of the chassis 210 (as shown in FIG. 1). The first tray 240 is reciprocally and slidably disposed in the fixing recess 233, so the first tray 240 is able to reciprocally slide in or slide out of the fixing recess 233 in a sliding direction S. The first tray 240 is formed with two position-limiting parts 244 arranged with an interval. An imaginary line L defined between the two position-limiting parts 244 is parallel to the sliding direction S. The second tray 250 is reciprocally and slidably disposed on the first tray 240, and the second tray 250 can be restrained on the first tray 240, so the second tray 250 is able to reciprocally slide on the first tray 240 along the sliding direction S. The second tray 250 is formed with two push portions 255 arranged with an interval, the two push portions 255 are both on the imaginary line L, i.e., the imaginary line L passes both of the two push portions 255. Each of the hard disk drivers 211 is physically contacts with the second tray 250, but can be disposed on the first tray 240 and the second tray 250 at the same time.

According to this embodiment, the storage array module 200 is installed in a server 100, for example the storage array module 200 is slidably disposed in a machine case 110 of the server 110 thereby being able to be pushed into the machine case 110 or pulled out of the machine case 110; in more details, the storage array module 200 is slidably disposed in an upper layer zone 110U of the machine case 110, or the quantity of the storage array module 200 is two and a gap 110G is kept between the two.

However, the storage array module 200 provided by the present disclosure is not limited to be applied in the server 100 only.

Figure 2B:
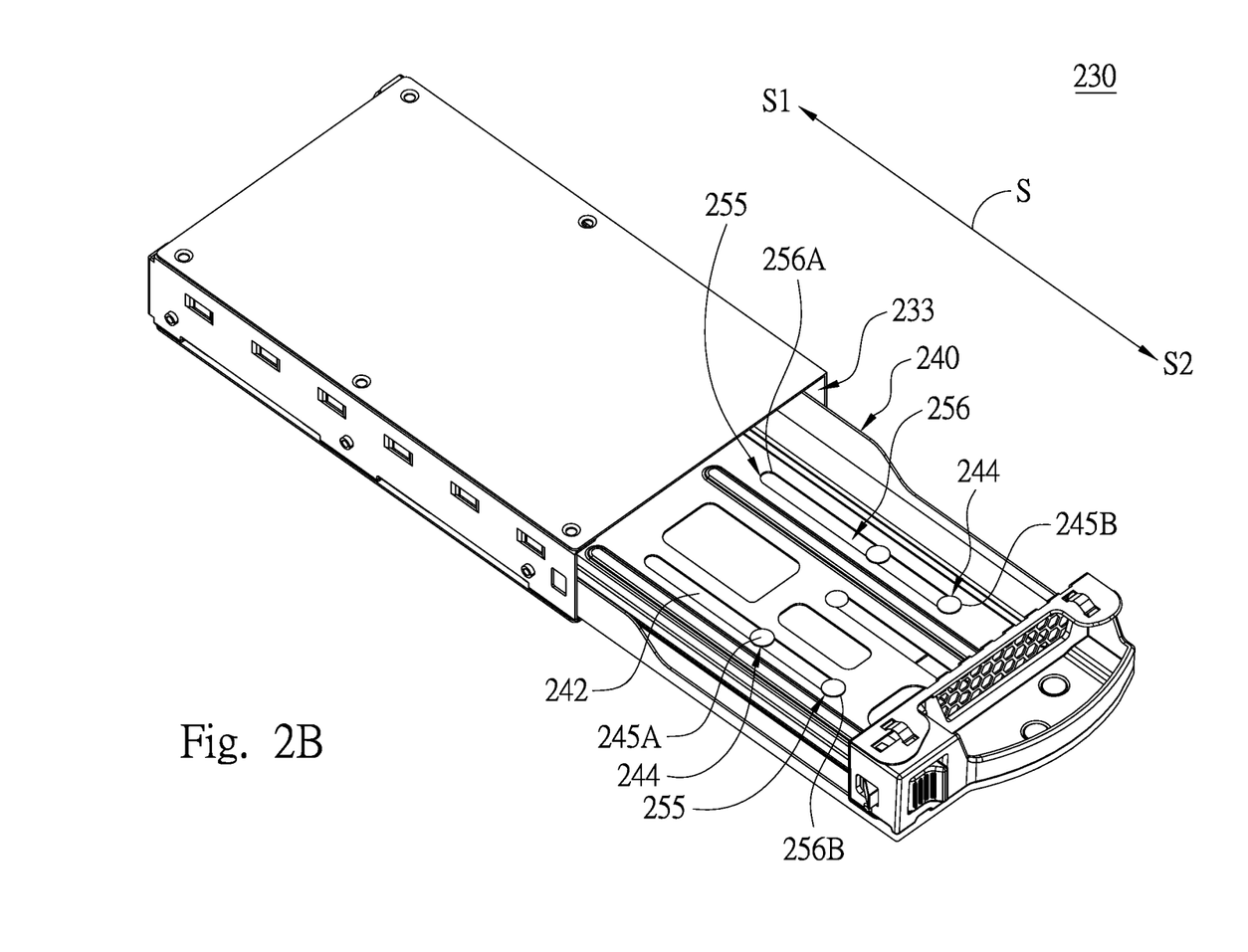
FIG. 2B is a schematic view illustrating the hard disk accommodating unit of FIG. 2A being in a second pulling out status.
Figure 2C:
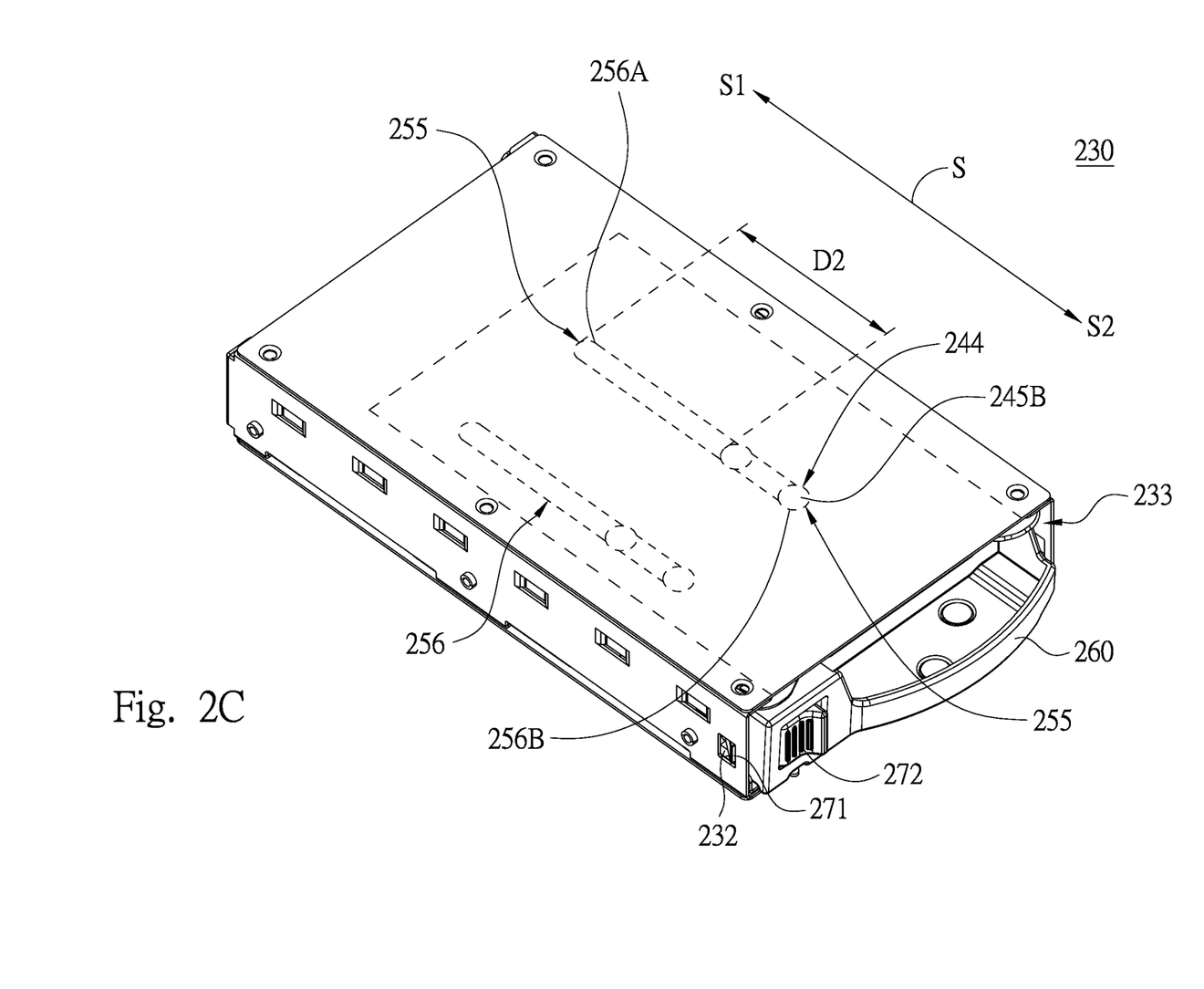
FIG. 2C is a schematic view illustrating the hard disk accommodating unit of FIG. 2A being in a returning status.

Reference is now made to FIG. 2B and FIG. 2C in which FIG. 2B is a schematic view illustrating the hard disk accommodating unit 230 of FIG. 2A being in a second pulling out status, and FIG. 2C is a schematic view illustrating the hard disk accommodating unit 230 of FIG. 2A being in a returning status.

As shown in FIG. 2A and FIG. 2B, the first tray 240 includes a bottom plate 241 and two lateral walls 243 formed at two opposite long sides of the bottom plate 241 and extended towards the same direction (e.g., upward). The bottom plate 241 is formed with a first convex column 245A, a second convex column 245B and a first carrying surface 242. The first carrying surface 242 is served to support the second tray 250 and the hard disk driver 221 (as shown in FIG. 1). The first convex column 245A and the second convex column 245B are protruded from the first carrying surface 242 and respectively acted as the two position-limiting parts 244. The first convex column 245A and the second convex column 245B are rivets, screws or other similar members.

The second tray 250 includes a tray body 251 and at least one linear opening 256. The tray body 251 is formed with a second carrying surface 252. The second carrying surface 252 is served to support and physically contact with the hard disk driver. The linear opening 256 is formed on the second carrying surface 252 of the tray body 251, and two opposite inner edges (defined as a first inner edge 256A and a second inner edge 256B) of the linear opening 256 are respectively served as the push portions 255. One end of the first convex column 245A and the second convex column 245B are both connected to the first carrying surface 242 of the first tray 240, the other end passes the linear opening 256, for example, as shown in FIG. 2A, the first convex column 245A and the second convex column 245B are e.g., round rivets which cover on the second carrying surface 252 after the other end protruding the linear opening 256.

As shown in FIG. 2A, a first pulling out status is defined as the maximum level of the second tray 250 being pulled out from the first tray 240 and the first inner edge 256A of the linear opening 256 being in contact with the first convex column 245A. The second tray 250 further includes a handle 260. The handle 260 is arranged at a distal end of the tray body 251 which is away from the first inner edge 256A thereby being permanently located outside the fixing recess 233, so a user can utilize the handle 260 to pull the second tray 250 out of the fixing recess 233.

What shall be addressed in that the first convex column 245A and the second convex column 245B of the first tray 240 and the linear opening 256 of the second tray 250 are not limited to be arranged on the first carrying surface 242 and the second carrying surface 252, the mentioned components can also be arranged on other adjacent lateral walls of the first tray 240 and the second tray 250. Moreover, the sliding means of the first tray 240 and the second tray 250 are not limited to certain types, the sliding means can be adopting as sliding rails, sliding wheels, sliding blocks or simply adopting the sliding of the tray itself.

Thus, when the second tray 250 shown in FIG. 2A slides a first distance D1 along a slide in direction S1 of the sliding direction S, the first distance D1 is defined as the distance between the second inner edge 256B and the second convex column 245B, the second tray 250 is completely disposed on the first carrying surface 242 of the first tray 240, and the second inner edge 256B of the linear opening 256 starts to be in contact with the second convex column 245B (as shown in FIG. 2B), thereby being defined as a second pulling out status. In the second pulling out status, the second inner edge 256B pushes the second convex column 245B, so the first tray 240 is enabled to slide along the slide in direction S1 of the sliding direction S, the second tray 250 and the first tray 240 are both pushed into the fixing recess 233 (as shown in FIG. 2C), thereby being defined as a returning status.

Figure 2D:
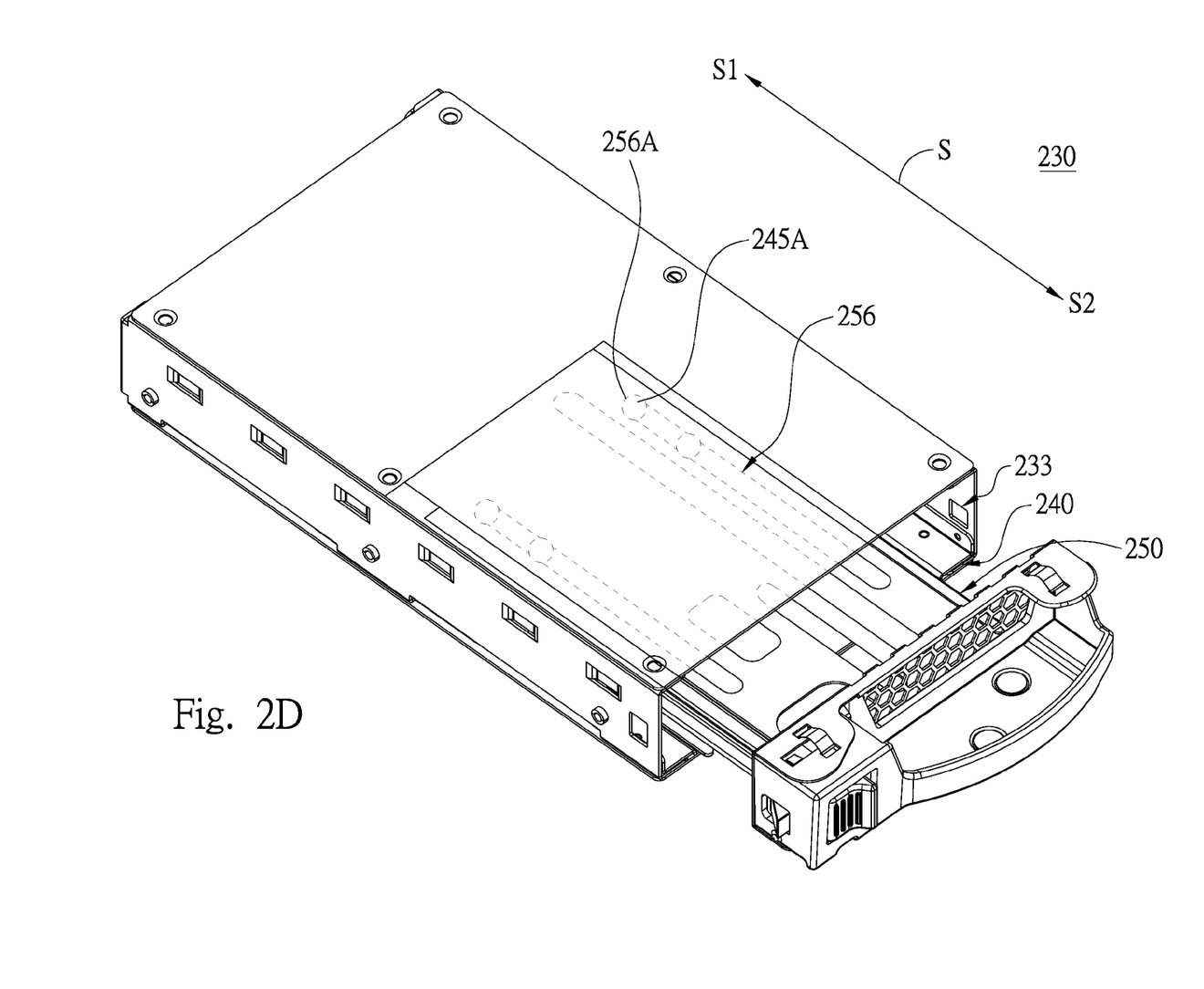
FIG. 2D is a schematic view illustrating the hard disk accommodating unit of FIG. 2A being in a third pulling out status.

FIG. 2D is a schematic view illustrating the hard disk accommodating unit 230 of FIG. 2A being in a third pulling out status. As shown in FIG. 2C and FIG. 2D, when the second tray 250 shown in FIG. 2C slides a second distance D2 along a slide out direction S2 of the sliding direction S, the first inner edge 256A of the linear opening 256 starts to be in contact with the first convex column 245A (as shown in FIG. 2D), the second distance D2 is defined as the distance between the first inner edge 256A and the first convex column 245A and is the same as the first distance D1, so the current status is defined as a third pulling out status. In the third pulling out status, the first inner edge 256A pushes the first convex column 245A, the first tray 240 is enabled to slide along the slide out direction S2 of the sliding direction S, so the second tray 250 and the first tray 240 are both pulled out of the fixing recess 233 (as shown in FIG. 2A) thereby returning to the first pulling out status.

Thus, when the hard disk driver 221 (shown in FIG. 1) is placed on the second carrying surface 252 of the second tray 250, and the hard disk accommodating unit 230 enters the returning status after being in the first pulling out status and the second pulling out status, the second connection port 222 of the hard disk driver 221 can be inserted in the first connection port 111 for exchanging data and receiving power supply.

Figure 3A:
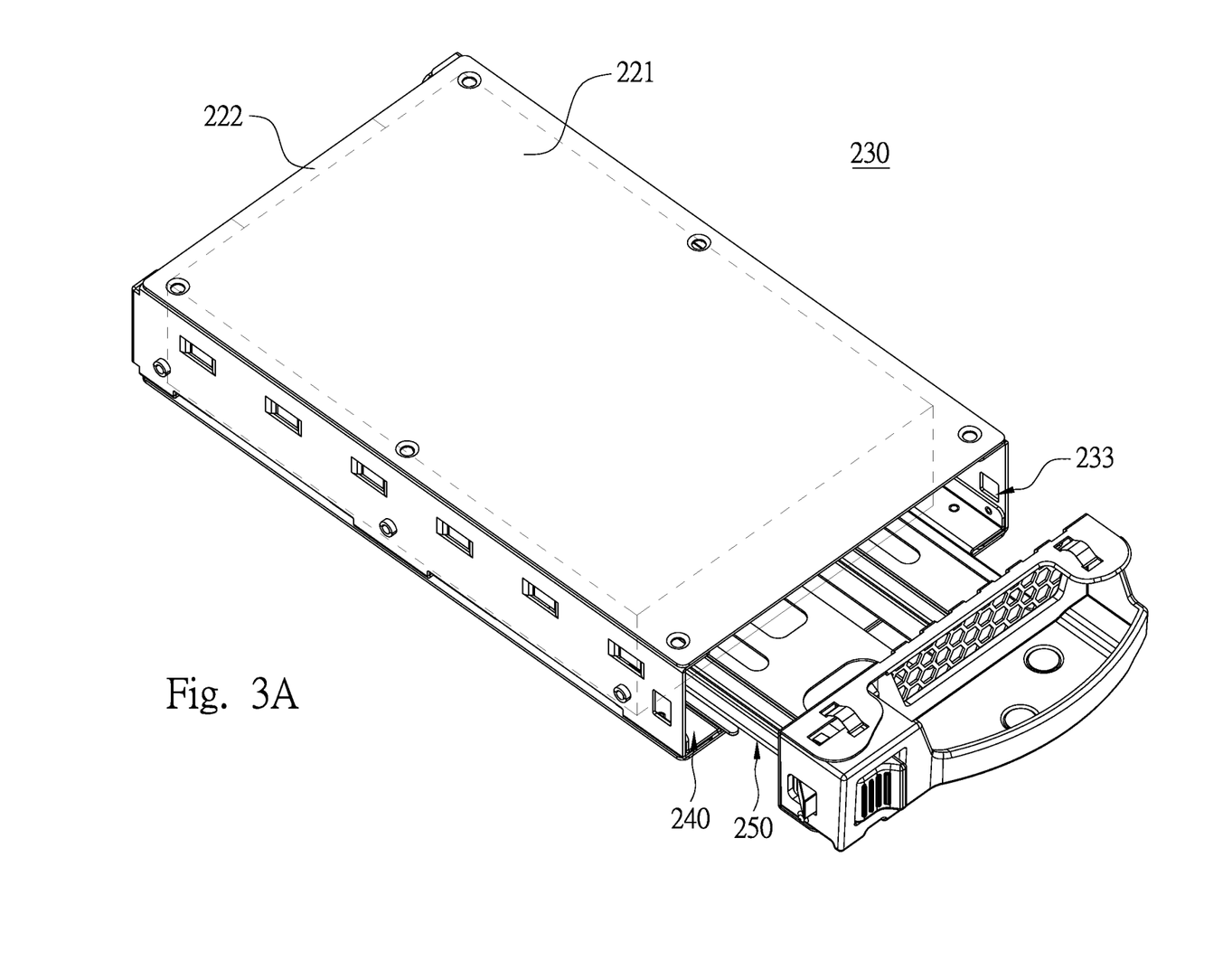
FIG. 3A is a flowchart showing a hard disk driver being taken out from the hard disk accommodating unit.
Figure 3B:
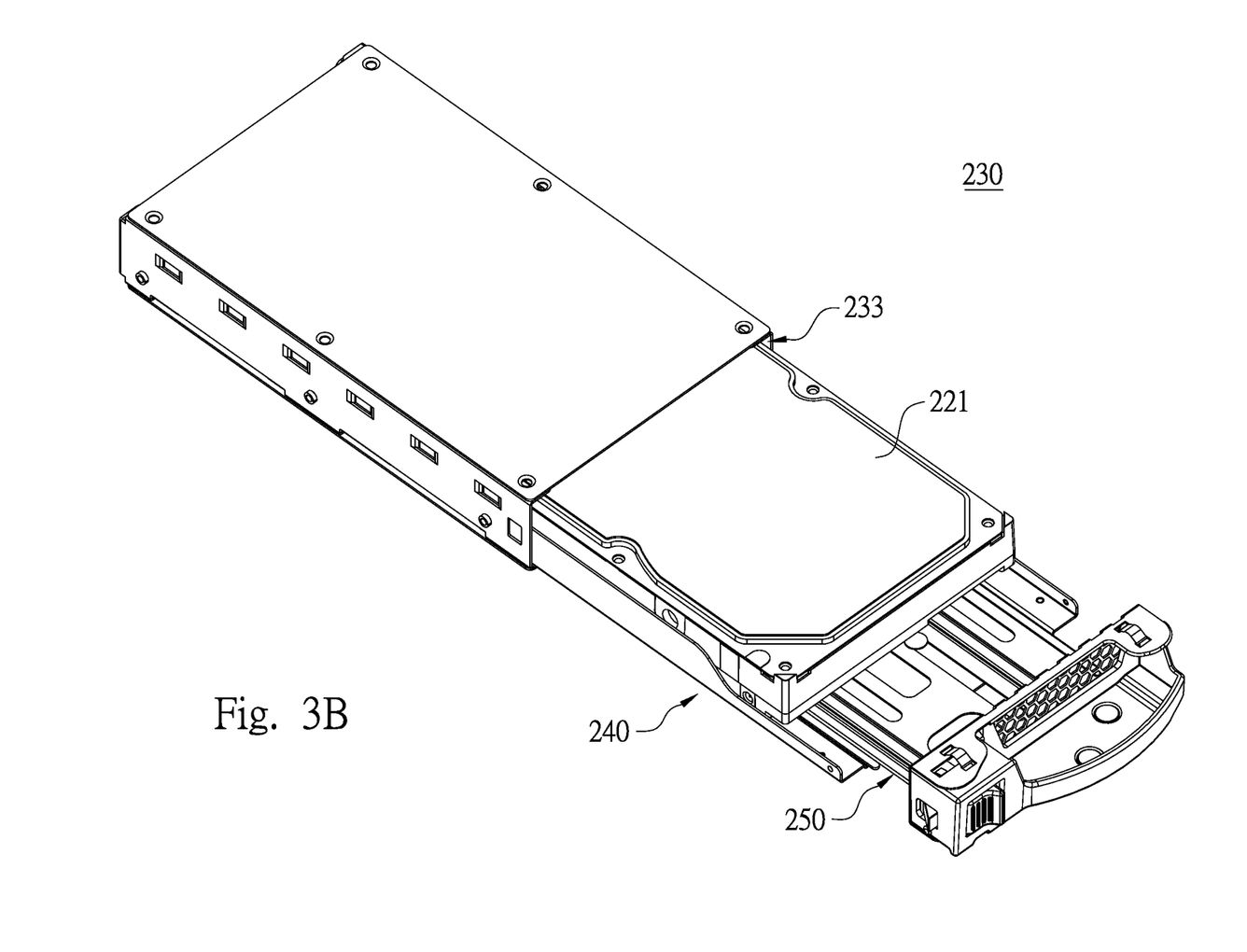
FIG. 3B is another flowchart showing a hard disk driver being taken out from the hard disk accommodating unit.

FIG. 3A is a flowchart showing a hard disk driver 221 being taken out from the hard disk accommodating unit 230, and FIG. 3B is another flowchart showing a hard disk driver 221 being taken out from the hard disk accommodating unit 230.

When the hard disk accommodating unit 230 is operated for entering the first pulling out status (as shown in FIG. 3B) from the returning status and the third pulling out status (as shown in FIG. 3A), the second connection port 222 of the hard disk driver 221 is released from the first connection port 111 (as shown in FIG. 1), so the hard disk driver 221 is no longer fastened by any other structure. Accordingly, the user can take out the hard disk driver 221 thereby achieving the objective of removing or replacing the hard disk driver 221.

However, the position-limiting part of the first tray 240 and the push part of the second tray 250 are not limited to the disclosure, the position-limiting part of the first tray 240 and the push part of the second tray 250 can also be alternated as followings.

Figure 4A:
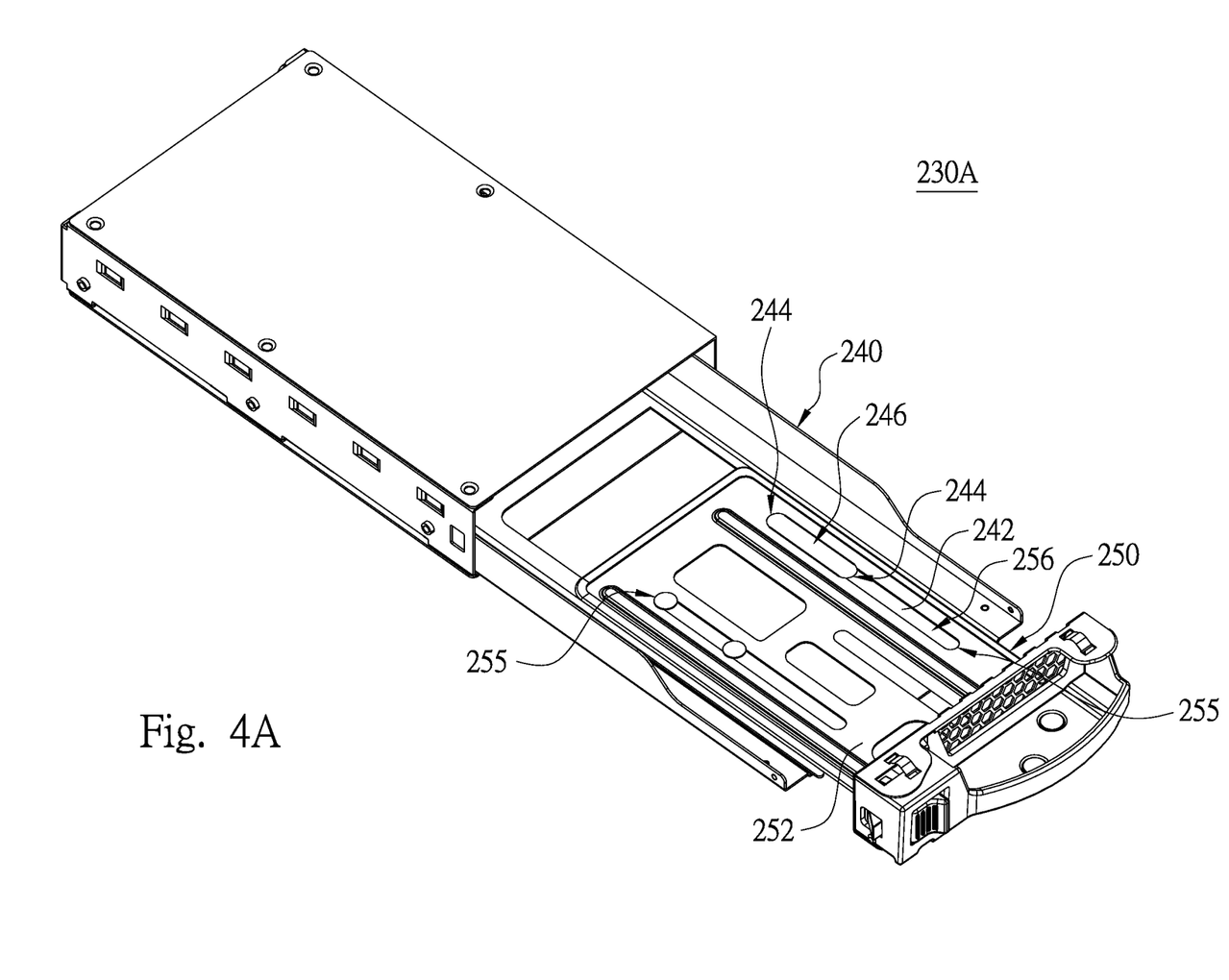
FIG. 4A is a perspective view showing the hard disk accommodating unit according to another embodiment of the present disclosure.

FIG. 4A is a perspective view showing the hard disk accommodating unit 230A according to another embodiment of the present disclosure. According to another embodiment disclosed in FIG. 4A, the structure of the second tray 250 is the same as the structure disclosed in FIG. 2A, therefore no further illustration is provided. However, the first tray 240 further includes a linear flange 246 protruded on the first carrying surface 242 of the first tray 240 and extended from the first carrying surface 242 of the first tray 240 into the linear opening 256, so two opposite ends of the linear flange 246 can be respectively served as the position-limiting part 244, two opposite inner edges of the linear opening 256 can be respectively served as the push part 255.

However, the linear flange 246 of the first tray 240 and the linear opening 256 of the second tray 250 are not limited to be arranged on the first carrying surface 242 and the second carrying surface 252, the mentioned components can also be arranged on other adjacent lateral walls of the first tray 240 and the second tray 250.

Figure 4B:
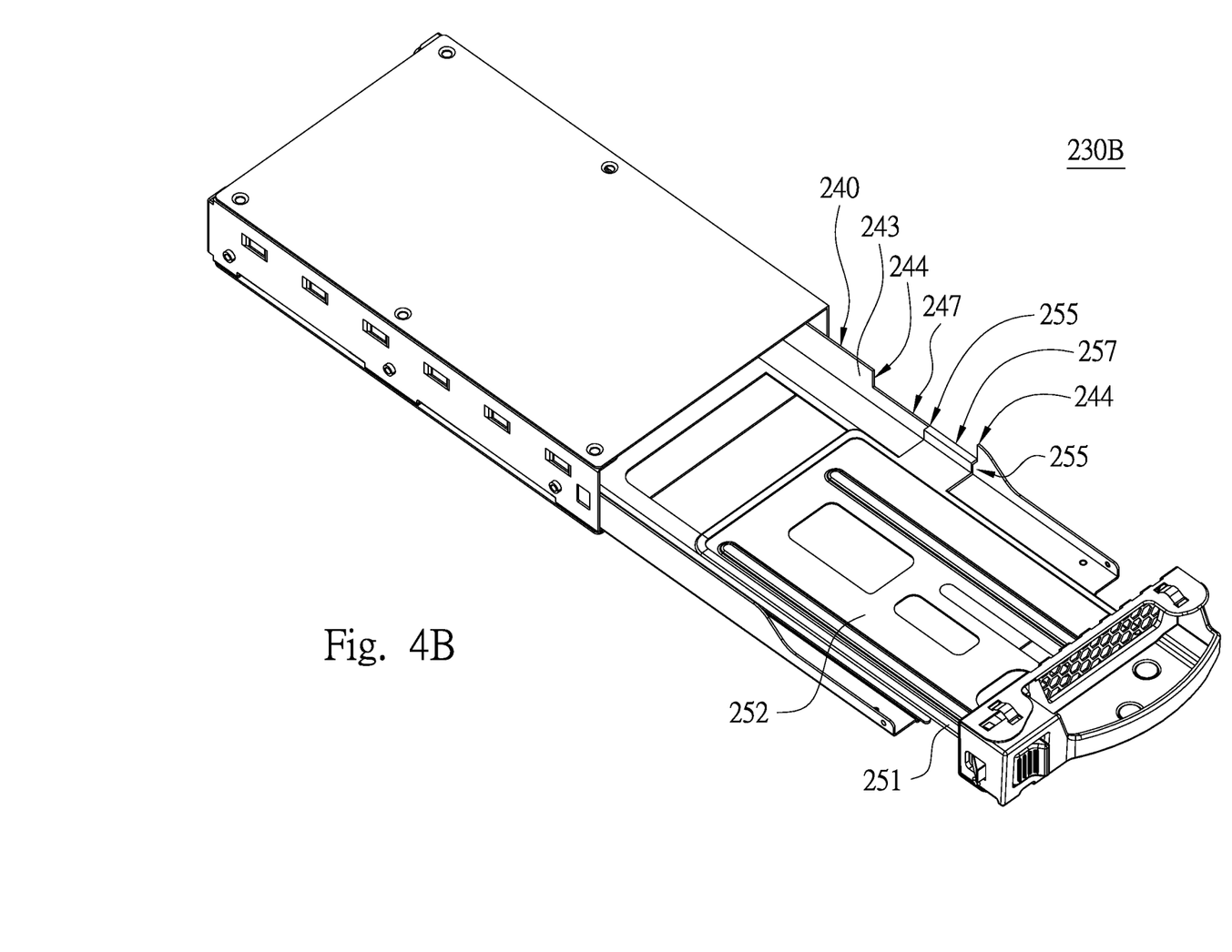
FIG. 4B is a perspective view showing the hard disk accommodating unit according to one another embodiment of the present disclosure.

FIG. 4B is a perspective view showing the hard disk accommodating unit 230B according to one another embodiment of the present disclosure. As shown in FIG. 4B, the structure of the first tray 240 is similar to the structure disclosed in FIG. 2A, the difference is that the first tray 240 further includes a linear notch 247 formed on the mentioned lateral wall 243. The structure of the second tray 250 is similar to the structure disclosed in FIG. 2A, the difference is that the second tray 250 further includes an extending fin 257. The extending fin 257 is extended from the second carrying surface 252 of the tray body 251 to the lateral wall 243 of the first tray 240, and slidably engaged on the linear notch 247. Thus, two opposite outer edges of the extending fin 257 can be respectively served as the push part 255, two opposite inner edges of the linear notch 247 can be respectively served as the position-limiting part 244.

However, the linear notch 247 of the first tray 240 and the extending fin 257 of the second tray 250 are not limited to be arranged on the lateral wall 243, the mentioned components can also be arranged on the first carrying surface 242.

Figure 5:
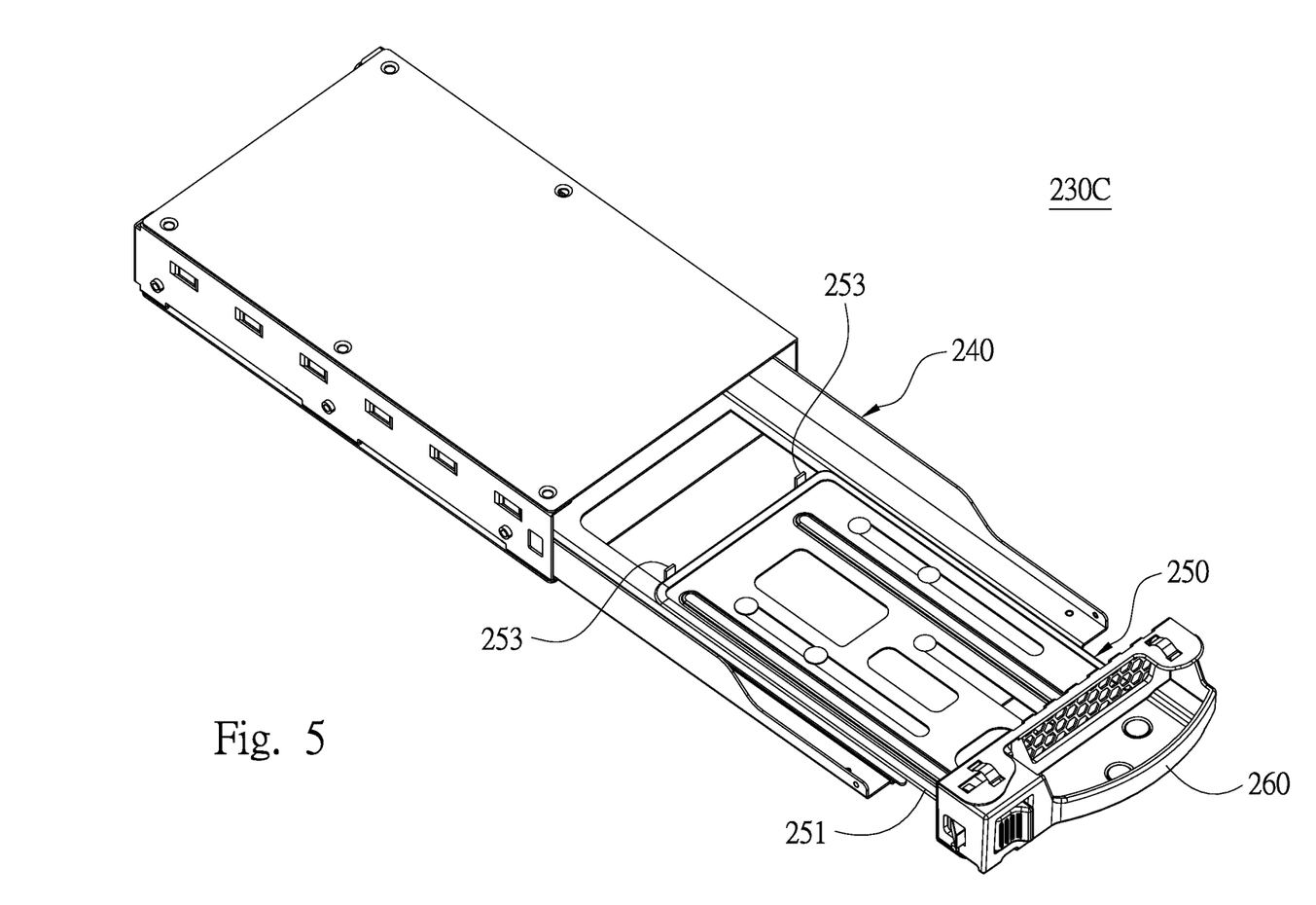
FIG. 5 is a perspective view showing the hard disk accommodating unit according to still one embodiment of the present disclosure.

FIG. 5 is a perspective view showing the hard disk accommodating unit 230C according to still one embodiment of the present disclosure. As shown in FIG. 1 and FIG. 5, the second tray 250 further includes two blocks 253 arranged at the other distal end of the tray body 251 opposite to the handle 260 and upwardly protrude. Thus, when a hard disk accommodating unit 230C is operated to the third pulling out status from the returning status (as shown in FIG. 3A), i.e., before the first tray 240 of the hard disk accommodating unit 230C is pushed, the second tray 250 drives the blocks 253 to push the hard disk driver 221 (show in FIG. 1), the second connection port 222 of the hard disk driver 221 is forced to be released from the first connection port 111, thereby preventing the second connection port 222 of the hard disk driver 221 from not being able to protrude from the fixing recess 233 with the second tray 250 due to over tight connection with the first connection port 111.

As shown in FIG. 2A, the second tray 250 further includes plural linear protrusions 258. The linear protrusions 258 are parallel to each other and arranged on the second carrying surface 252 for being physically contacted and supporting the hard disk driver. In addition, the linear protrusions 258 are in line contact with the hard disk driver thereby lowering the friction between the hard disk driver and the second tray 250.

Figure 6:
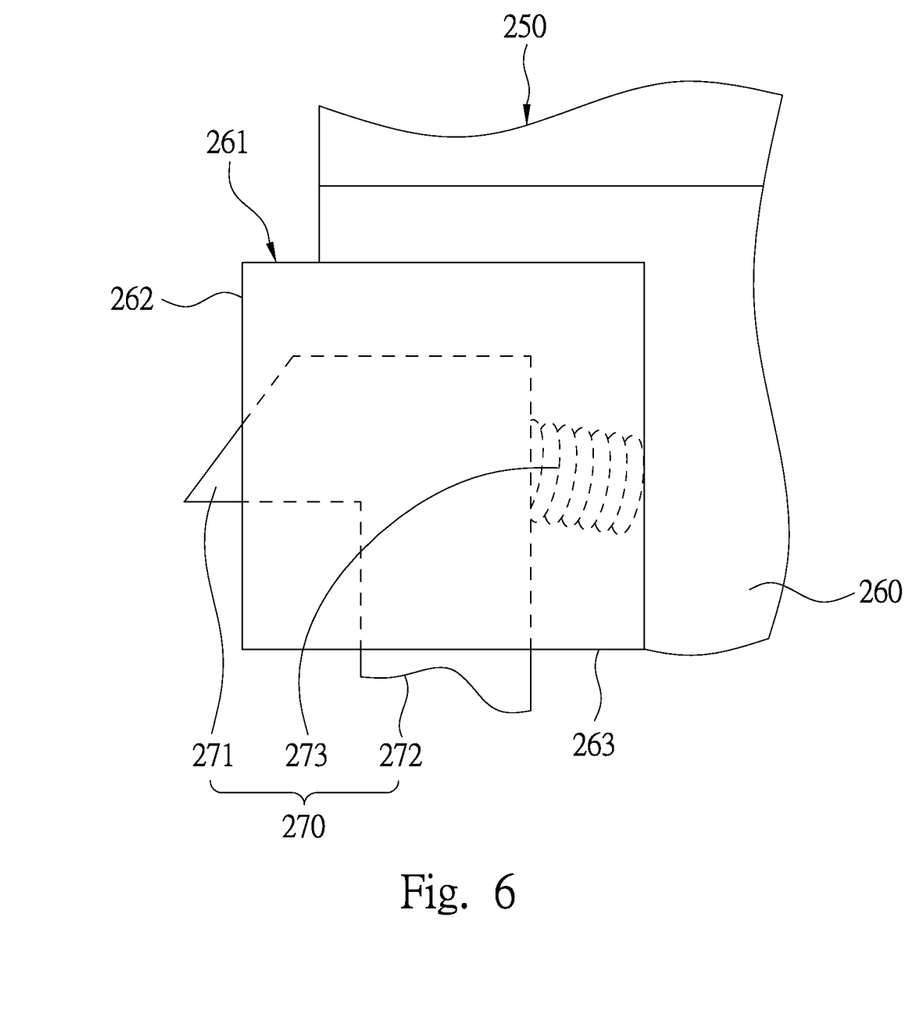
FIG. 6 is a schematic view showing the latch unit of the hard disk accommodating unit according to another embodiment of the present disclosure.

FIG. 6 is a schematic view showing the latch unit 270 of the hard disk accommodating unit 230 according to another embodiment of the present disclosure. As shown in FIG. 2C and FIG. 6, the second tray 250 further includes a latch unit 270. The latch unit 270 includes a latch piece 271, an operation portion 272 and a spring member 273. The latch piece 271 is disposed in an inner space 261 of the handle 260, and partially protruded out from a surface 262 of the handle 260. The operation portion 272 is disposed in the inner space 261, connected to the latch piece 271, and partially protruded out from another surface 263 of the handle 260. The spring member 273 is disposed in the inner space 261, connected to the latch piece 271 and the handle 260. When the latch piece 271 and the operation portion 272 are pushed for pressing the spring member 273, the spring member 273 is compressed; after the latch piece 271 and the operation portion 272 stop pressing the spring member 273, the spring member 273 enables the latch piece 271 and the operation portion 272 to be recovered to original position.

So when the hard disk accommodating unit 230 enters the returning status, the latch piece 271 is pushed for protruding into a latch slot 232 formed on an inner wall of the fixing recess 233, so the latch piece 271 is latched in the latch slot 232 (as shown in FIG. 2C), thereby restraining the second tray 250 from freely sliding in the fixing recess 233; on the other hand, when the operation portion 272 is pushed for allowing the latch piece 272 to be retracted into the inner space 261, the latch piece 271 is released from the latch slot 232, thereby enabling the second tray 250 to freely slide in the fixing recess 233 (as shown in FIG. 2A).

In addition, as shown in FIG. 2A, the first tray 240 is restrained in the fixing recess 233, so the first tray 240 is unable to be completely released from the fixing recess 233; for example, the first tray 240 further includes two first stop parts 254, each of the stop parts 254 is e.g., a columnar member at the distal end of the first tray 240. The fixing recess 230 includes two second stop parts 234, in which each of the second stop parts 234 is e.g., a columnar member downwardly protruded from the top inner wall and arranged in the movement stroke of the first stop part 254. Accordingly, through the second stop part 234 stopping the first stop part 254, the first tray 240 is unable to be completely released from the fixing recess 233.

Although the present disclosure has been described with reference to the preferred embodiments thereof, it is apparent to those skilled in the art that a variety of modifications and changes may be made without departing from the scope of the present disclosure which is intended to be defined by the appended claims.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A hard disk accommodating unit, comprising:
    a fixing recess;
    a first tray reciprocally and slidably disposed in the fixing recess;
    two position-limiting parts disposed on the first tray and arranged with an interval, an imaginary line between the two position-limiting parts being parallel to a sliding direction of the first tray;
    a second tray reciprocally and slidably disposed on the first tray, and used for mounting a hard disk drive; and
    two push portions disposed on the second tray and arranged with an interval, and both of the two push portions being passed by the imaginary line,
    wherein the first tray and the second tray are independently slidable, along the sliding direction, relative to the fixing recess,
    wherein, when the second tray slides a distance along the sliding direction, one of the push portions starts to push one of the position-limiting parts, so that the first tray is pushed into the fixing recess, and
    when the second tray protrudes from the fixing recess and slides the distance, the other push portion starts to push the other position-limiting part, such that the first tray is pulled out of the fixing recess.

2. The hard disk accommodating unit according to claim 1, wherein the second tray comprises a linear opening, two opposite inner edges of the linear opening are respectively acted as the two push portions, and each of the two position-limiting parts is a convex column connected to a first carrying surface of the first tray and passing through the linear opening.

3. The hard disk accommodating unit according to claim 1, wherein the second tray comprises a linear opening, and two opposite inner edges of the linear opening are respectively acted as the two push portions; and
    the first tray comprises a linear flange connected to the first carrying surface of the first tray and passing through the linear opening, wherein two opposite ends of the linear flange are respectively acted as the two position-limiting parts.

4. The hard disk accommodating unit according to claim 1, wherein the first tray comprises:
    a first carrying surface supporting the second tray;
    a lateral wall adjacently connected to the first carrying surface; and
    a linear notch formed on the lateral wall, wherein two opposite inner edges of the linear notch are respectively acted as the two position-limiting parts.

5. The hard disk accommodating unit according to claim 4, wherein the second tray comprises:
    a second carrying surface supporting the hard disk drive; and
    an extending fin extended from the second carrying surface to the lateral wall of the first tray, and slidably engaged on the linear notch, wherein two opposite outer edges of the extending fin are respectively acted as the two push portions.

6. The hard disk accommodating unit according to claim 1, wherein the second tray comprises a plurality of linear protrusions, the linear protrusions are parallel to each other, and respectively physically contact with the hard disk drive.

7. The hard disk accommodating unit according to claim 1, wherein the second tray comprises:
   a tray body;
   a handle disposed at a distal end of the tray body and located outside the fixing recess, and formed with an inner space therein;
   a latch piece disposed in the inner space, and partially protruded out from one surface of the handle;
   an operation portion disposed in the inner space, connected to the latch piece, and partially protruded out from another surface of the handle; and
   a spring member disposed in the inner space, connected to the latch piece and the handle.

8. The hard disk accommodating unit according to claim 7, wherein an inner wall of the fixing recess is further formed with a latch slot, when the first tray slides into the fixing recess, the latch piece is latched in the latch slot.

9. The hard disk accommodating unit according to claim 7, wherein the second tray further comprises at least one block, and the block is disposed at the other distal end of the tray body opposite to the handle,
   wherein, when the second tray protrudes out of the fixing recess, the block enables the hard disk drive to be released from a connector in a chassis.

10. The hard disk accommodating unit according to claim 1, wherein the first tray comprises a first stop part, the fixing recess comprises a second stop part therein,
    wherein by the second stop part stopping the first stop part, the first tray is unable to be completely released from the fixing recess.

11. A storage array module, comprising:
    a chassis housing formed with a plurality of first connection ports;
    a plurality of hard disk accommodating units, each of the hard disk accommodating units comprising:
    a fixing recess fastened in the chassis;
    a first tray reciprocally and slidably disposed in the fixing recess;
    a second tray reciprocally and slidably disposed on the first tray, and used for mounting a hard disk drive; and
    two push portions disposed on the second tray and arranged with an interval, and an imaginary line between the two push portions being parallel to a sliding direction of the first tray; and
    a plurality of hard disk drives, each of the hard disk drives being disposed on the first tray and the second tray, and formed with a second connection port detachably coupled to one of the first connection ports,
    wherein the first tray and the second tray are independently slidable, along the sliding direction, relative to the fixing recess,
    wherein, when the second tray of each of the hard disk accommodating units slides a distance in the sliding direction, one of the two push portions starts to push the first tray, such that the first tray is pulled out of the fixing recess; and
    before the first tray of each of the hard disk accommodating units is pushed, one of the first connection ports has been released from the corresponding second connection port.

* * * * *